United States Patent [19]

Wilkinson

[11] Patent Number: 5,097,320
[45] Date of Patent: Mar. 17, 1992

[54] ENCODING AND DECODING OF MAC VIDEO SIGNALS

[75] Inventor: James H. Wilkinson, Tadley, England

[73] Assignee: Sony Corporation, Tokyo, Japan

[21] Appl. No.: 658,680

[22] Filed: Feb. 21, 1991

[30] Foreign Application Priority Data

Feb. 26, 1990 [GB] United Kingdom ............... 9004291

[51] Int. Cl.⁵ ......................... H04N 7/12; H04N 9/20
[52] U.S. Cl. ....................................... 358/12; 358/11
[58] Field of Search ................. 358/11, 12, 140, 141

[56] References Cited

U.S. PATENT DOCUMENTS

| | | | |
|---|---|---|---|
| 4,811,095 | 3/1989 | Harm | 358/11 |
| 4,908,697 | 3/1990 | Tsinberg | 358/12 |
| 4,935,813 | 6/1990 | Fonsalas | 358/12 |
| 4,965,667 | 10/1990 | Trew et al. | 358/141 |
| 4,994,899 | 2/1991 | Rhodes | 358/11 |
| 5,027,206 | 1/1991 | Vreeswijk | 358/141 |

Primary Examiner—Tommy P. Chin
Attorney, Agent, or Firm—Alvin Sinderbrand; William S. Frommer

[57] ABSTRACT

A MAC signal encoder, for encoding a video signal into MAC format, includes vertical sub-samplers for vertically sub-sampling color difference signals of the video signal, vertical filters that vertically filter the color difference signals prior to their vertical sub-sampling so as to limit their spectra to a band below the vertical Nyquist frequency of the sub-sampled color difference signals, a multiplexer that multiplexes together the filtered and sub-sampled color difference signals and luminance information of the video signal to produce a signal in MAC format, and a marker detector responsive to the video signal containing marker information indicating that the signal has previously been MAC encoded to inhibit the vertical filtering of the color difference signals by the vertical filters.

25 Claims, 1 Drawing Sheet

ENCODING AND DECODING OF MAC VIDEO SIGNALS

BACKGROUND OF THE INVENTION

1. Field of the Invention

This invention relates to the encoding and decoding of multiplexed analog components (MAC) video signals.

2. Description of the Prior Art

For many years, color television (TV) signals have been transmitted using the PAL, NTSC and SECAM color systems. Due to the huge amounts of monochrome equipment in existence when these three systems were initially contemplated, economic and bandwidth considerations imposed a large restraint on their designs. Specifically, the systems had to be compatible with existing monochrome systems in that they had to transmit their signals over existing channels and in that their signals had to be such that they could be received (in monochrome) on existing monochrome receivers as well as being received (in color) on color receivers. As a result, the systems were so designed that the chrominance (color) information was transmitted within the same frequency band as the luminance information, the chrominance and luminance information or signals being combined to form a so-called composite signal. This is possible by virtue of the fact that, by modulating the chrominance information onto a color sub-carrier of a precisely controlled frequency, it is possible to interleave the frequency spectra of the chrominance and luminance signals so that they suffer minimal interference (cross-talk) with one another. In practice, a certain amount of cross-talk (cross-color and cross-luminance) does in fact occur, at least in some circumstances.

In more recent times, with the advent of direct broadcast by satellite (DBS) systems, which are not subject to the constraint of having to be sent by existing (terrestrial) channels, the MAC system was designed. There are several variants of the MAC system, including normal definition MAC, widescreen MAC, high definition MAC, B-MAC, C-MAC, D-MAC, D2-MAC and so on. All of the variants are characterized by the fact that, instead of being sent in composite form, the chrominance and luminance signals are sent sequentially, that is on a time division multiplex basis, so that they cannot interfere with each other. Thus, cross-color and cross-luminance cannot occur.

A full description of the MAC system can be obtained from various published documents, including the following specification published by the European Broadcasting Union (EBU): "Specification of the systems of the MAC/packet family-Tech 3258-E", EBU Technical Centre, Brussels, October 1986. For present purposes, the relevant features of the MAC system are as follows. Each line (that is, each line scanning interval) of the transmitted signal includes time-compressed chrominance information and time-compressed luminance information, the chrominance and luminance information being sent one after the other. In similar manner to existing systems, the chrominance information comprises two color difference signals. However, the two color difference signals are not both sent during each line. Rather, to reduce transmission bandwidth, the respective two color difference signals are sent on a line sequential basis, that is during alternate lines. Thus, odd-numbered lines of a frame will contain one of the color difference signals and even-numbered lines of the frame will contain the other of the color difference signals. However, since the number of lines per frame is odd, for example 625 for normal definition MAC, to simplify the design of equipment used in the system the sequence of the color difference signals is reset between frames so that each one of the color difference signals is always sent during lines of the same number in successive frames. That is, the (n)th line of each successive frame will always include one of the color difference signals and the (n+1)th line of each successive frame will always include the other of the color difference signals.

Prior to transmission, in an encoder for encoding signals into the MAC format, the color difference signals are vertically sub-sampled to achieve the desired line sequential color difference information. That is to say, alternate vertically adjacent samples of each of the color difference signals are discarded to leave, for each line, samples for one only of the color difference signals. Sub-sampling resulting in the elimination of every other sample will, of course, result in halving of the vertical Nyquist frequency. In the absence of any corrective measure, this would lead to vertical chrominance aliasing. So, the color difference signals also have to be vertically prefiltered so that their spectra are restricted to a band substantially below the halved vertical Nyquist frequency. The filtering can be effected in an analog or digital finite impulse response (FIR) filter of conventional design, using appropriate weighting coefficients to achieve the desired bandwidth reduction. Thus, in summary, the color difference signals are subjected to a process known as "decimation" (passed through a "decimation filter"), in which the color difference signals are vertically filtered and vertically sub-sampled.

At the receivers, in a decoder for decoding the received signals from the MAC format into a form suitable for display, the recovered sub-sampled color difference signals are interpolated to estimate the color difference information that was discarded, prior to transmission, in the sub-sampling operation. That is to say, an interpolation filter estimates, for each line, that one of the two color difference signals that was not transmitted for that line by taking averages between that one of the two color difference signals transmitted during other lines, for example the two lines immediately above and below it. The transmitted luminance signal, the transmitted color difference signals and the estimated color difference signals can then be converted into a conventional format (such as RGB) for display.

The above-described operation of prefiltering the color difference signals before transmission will, of course, involve some loss of frequency response and therefore, in principle, some degradation in picture quality. In practice, it has been found that the degradation is so slight as to be virtually undetectable to the eye, even under stringent test conditions. This is because the eye's response to color information is poor so that, for example, information about picture edges is given largely by luminance information only. A similar (negligible) degree of picture degradation results from the operation of filtering carried out at the receiver by the interpolating filter. Thus, it was not anticipated that the need to filter the color difference signals prior to transmission, and the need to filter them on reception (in the interpolating filter), would give rise to any significant picture degradation problem.

At present, with the MAC system being fairly new, most studio equipment for use in MAC studios is of a conventional type, the signal being put into MAC format immediately before transmission. However, as the use of MAC systems becomes more extensive, it is probable that studio equipment specially designed to encode or convert signals into MAC format and/or to handle signals in MAC format will become generally available. (In particular, to take one example, it is probable that video tape recorders (VTRs) that can convert a signal into MAC format and store a signal in MAC format will be widely used.) This will involve signals being passed through MAC encoders and/or MAC decoders on multiple occasions. For example, MAC format VTRs may be used to make multi-generation copies of program material. Thus, the above-mentioned absence of any anticipation that the need to filter the signals would give rise to any significant picture degradation problem, which in retrospect seems to have involved an assumption (probably an unconscious assumption) that the filtering operation would be performed only once, will give rise to problems.

In the foregoing regard, tests conducted by the inventor have produced the following results. As indicated above, picture degradation in the case of one pass through the decimation filter and the interpolating filter is neglible. However, the frequency response is cumulative in the event of plural passes and reduced vertical chrominance resolution and color smearing of the picture are in fact observable in the event of plural passes. Picture degradation is clearly observable in the event of two passes and, after three or more passes, the picture looks "soft". In the event of more than three passes, the picture degradation is a serious problem.

Thus, the signal degradation experienced in the event of multiple passes through the decimation filter and/or the interpolating filter represents a very serious problem which poses a severe obstacle to the successful development of MAC systems.

An object of the invention is to solve the signal degradation problem explained above.

SUMMARY OF THE INVENTION

According to a first aspect of the invention there is provided a MAC signal encoder and a method for encoding a video signal into MAC format. The encoder comprises vertical sub-sampling means that vertically sub-samples chrominance information in the video signal to produce vertically sub-sampled color difference signals, and means for vertically filtering the color difference signals prior to their vertical sub-sampling so as to limit their spectra to a band below the vertical Nyquist frequency of the vertically sub-sampled color difference signals. A multiplexer is operative to multiplex together the filtered and sub-sampled color difference signals and luminance information of the video signal to produce a signal in MAC format. Detector means is responsive to the video signal containing marker information indicating that the signal has previously been MAC encoded to inhibit the vertical filtering of the color difference signals.

According to a second aspect of the invention there is provided a MAC signal decoder and a method for decoding a video signal which is in MAC format into a video signal in non-MAC format. The decoder comprises interpolating means that interpolates between vertically sub-sampled color difference signals in the MAC format signal to produce estimated color difference information, and a demultiplexer connected to receive the MAC format signal and the estimated color difference information and operative to demultiplex them to produce a video signal in non-MAC format. Marker means is operative to generate marker information, indicating that the signal has previously been MAC encoded, and to cause the marker information to be contained in the video signal in non-MAC format.

The above-mentioned problem can thus simply and elegantly be solved, at least partially, by use of such decoders and encoders in all relevant equipment, in that detection and insertion of the marker information should prevent the vertical filtering of the color difference signals from being carried out more than once.

Encoders and decoders in accordance with the invention can be used in a variety of types of equipment. They can also be used on a stand alone basis: for example, an encoder in accordance with the invention could be used to encode a live or recorded signal immediately before it is sent to a transmitter for sending it to a satellite for broadcasting. A preferred use of the encoders and decoders is in recording signals on a video tape recorder (VTR) and designed to record signals in MAC format and capable of reproducing such recorded signals, if desired, in a decoded (non-MAC) format. Thus, such a VTR can be provided with a codec (an encoder and a decoder) in accordance with the invention. The encoder of the codec is used to encode an input signal into MAC format so that it can be recorded in MAC format. The decoder of the codec can be used to decode a reproduced signal which is to be output in non-MAC format. With such an arrangement, the color difference signals will be filtered only on the first occasion of the signal being passed through the codec, so that multiple generation copying does not give rise to the problem explained above.

The marker information can in principle be of any recognisable form and can be inserted anywhere, for example in the video signal of MAC format or the video signal of non-MAC format, so as to be contained in the latter. It can, for example, be contained in luminance information of the signal, in which event it preferably is inserted in a vertical blanking interval so as not to interfere with the picture. For example, in the case of a 625 line system as used, for instance, in the UK, the marker information can be contained in line 21, where space not needed for other purposes is currently available. Advantageously, the marker information is such as to be visible if the vertical blanking interval is viewed, for instance by way of a monitor which can be switched into an underscanned mode (in which the vertical blanking interval is displayed above the picture). According to a particularly preferred embodiment, the marker information is in the form of a peak white level present during a predetermined interval of a line (for example for two microseconds after the start of the line) of the vertical blanking interval. The marker information is then not only visible, but can easily be identified whether the signal is in analog or digital form, for example by circuitry which is operative to look at the luminance level of the appropriate line at a predetermined timing (for example one microsecond) after the start of the line.

BRIEF DESCRIPTION OF THE DRAWINGS

The above and other objects, features and advantages of the invention will be apparent from the following detailed description of illustrative embodiments thereof, which is to be read in conjunction with the accompanying drawing, in which.

DESCRIPTION OF THE PREFERRED EMBODIMENTS

As explained above, the various different versions of a MAC video signal are all characterized by the fact that, instead of being sent in composite form, the chrominance and luminance components are sent sequentially, that is on a time division multiplex basis, so that they cannot interfere with each other. Specifically, a MAC signal is formed by encoding (multiplexing together) a luminance signal Y and two color difference signals which, in similar manner to the components of a PAL signal, are based upon B-Y and R-Y. The color difference signals as applied to an encoder for performing the encoding operation are referred to as Pb (the B-Y signal scaled to 0.7 V peak to peak) and Pr (the R-Y signal scaled to 0.7 V peak to peak).

Each line (that is, each line scanning interval) of the transmitted MAC signal includes time-compressed chrominance information and time-compressed luminance information, the chrominance and luminance information being sent one after the other. Specifically, one or the other of the color difference signals Pb and Pr is time compressed to occupy about the first one third of each line and the luminance signal Y is time compressed to occupy about the remaining two thirds of each line.

The two color difference signals Pb and Pr are not both sent during each line. Rather, to reduce transmission bandwidth, the respective two color difference signals Pb and Pr are sent on a line sequential basis, that is during alternate lines. Thus, odd-numbered lines of a frame will contain one of the color difference signals (for example the signal Pb) and even-numbered lines of the frame will contain the other of the color difference signals (for example the signal Pr). However, since the number of lines per frame is odd, for example 625 for low definition MAC, to simplify the design of equipment used in the system the sequence of the color difference signals Pb and Pr is reset between frames so that each one of the color difference signals is always sent during lines of the same number in successive frames. That is, the odd-numbered lines of successive frames will always include the same one of the color difference signals (for example the signal Pb) and the even-numbered lines of successive frames will always include the other of the color difference signals (for example the signal Pr).

Figure 1:
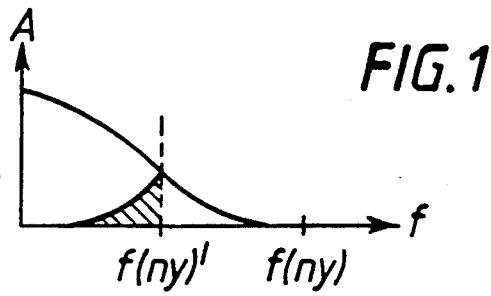
FIG. 1 is a graph of amplitude versus vertical frequency showing the frequency spectra of color difference signals applied to a MAC encoder for encoding, together with a luminance signal, into a MAC format video signal.

Prior to transmission, in the encoder for encoding the luminance signal Y and the color differences signals Pb and Pr into the MAC format, the color difference signals are vertically sub-sampled to achieve the desired line sequential color difference information. That is to say, alternate vertically adjacent samples of each of the color difference signals are discarded to leave, for each line, samples for one only of the color difference signals. Sub-sampling resulting in the elimination of every other sample will, of course, result in halving of the vertical Nyquist frequency. In the absence of any corrective measure, this would lead to vertical chrominance aliasing. The reason for this can be seen by referring to FIG. 1, which is a graph of amplitude A versus frequency f showing the vertical frequency spectra of the color difference signals Pb and Pr applied to the encoder. Prior to sub-sampling, the spectra lie within a band below the vertical Nyquist frequency f(ny) of the original sampling. The sub-sampling results in the vertical Nyquist frequency being reduced by a factor (in this case two) equal to the extent of the sub-sampling. That is, the vertical Nyquist frequency of the sub-sampled color difference signals Pb and Pr is reduced to a value f(ny)'. As will be seen from FIG. 1, parts of the spectra of the color difference signals Pb and Pr lie above the reduced vertical Nyquist frequency f(ny)'. In the absence of any corrective measure, these parts would be "folded back" after sub-sampling to occupy the regions of the spectra shown cross-hatched in FIG. 1, thereby causing vertical chrominance aliasing.

To avoid the aliasing, the color difference signals Pb and Pr are vertically prefiltered prior to sub-sampling so that their spectra are restricted to a band substantially below the halved vertical Nyquist frequency f(ny)'. Specifically, the color difference signals Pb and Pr are passed through low-pass filters which prevent substantially the passage of those parts of their spectra above the halved vertical Nyquist frequency f(ny)'. The filters can be finite impulse response (FIR) filters of conventional design, implemented in either analog or digital form, using appropriate weighting coefficients to achieve the desired bandwidth reduction. Thus, in summary, the color difference signals Pb and Pr are subjected to a process known as "decimation" (passed through a "decimation filter"), in which the color difference signals are vertically filtered and vertically sub-sampled.

Figure 2:
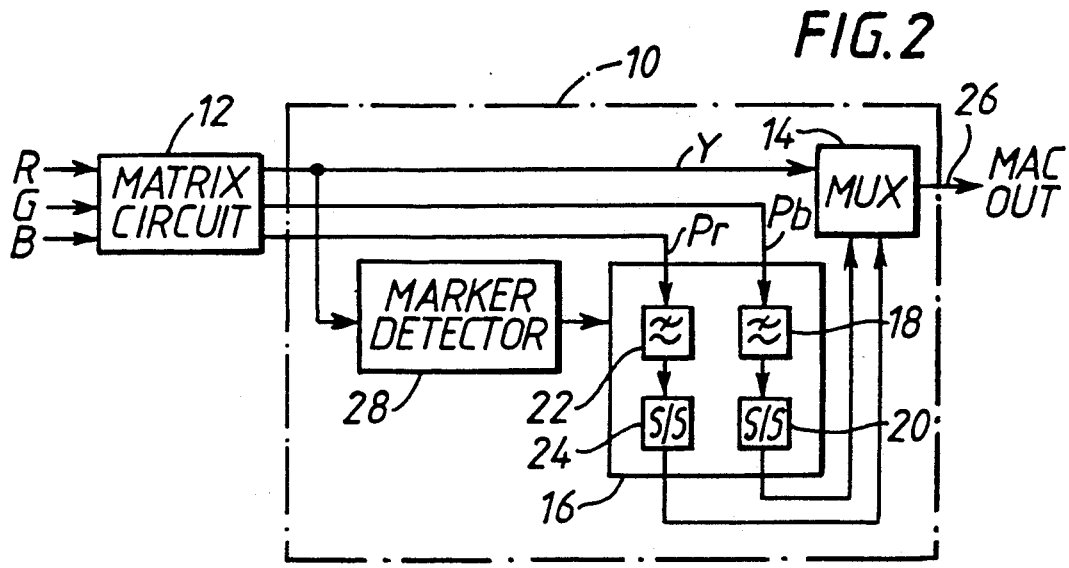
FIG. 2 is a schematic block diagram of a MAC encoder embodying the invention.

FIG. 2 shows a MAC encoder 10 embodying the invention for carrying out the operations described above. It is assumed that a video signal to be encoded is in RGB component form and that, prior to the signal being applied to the encoder 10, the signal is passed through a matrix circuit 12 which converts the RGB component signals into Y/Pb/Pr component signals for application to the encoder. (If desired, the matrix circuit could be included in the encoder 10.) In the encoder 10, the luminance signal Y is supplied to a multiplexer (MUX) 14 and the color difference signals Pb and Pr are supplied to a decimator circuit or filter 16. The decimator circuit 16 comprises a low-pass vertical filter 18 and a vertical sub-sampler (S/S) 20 for the color difference signal Pb and, likewise, a low-pass vertical filter 22 and a vertical sub-sampler (S/S) 24 for the color difference signal Pr. The filters 18 and 22 and the sub-samplers 20 and 24 perform the operations explained above. The filtered and sub-sampled color difference signals Pb and Pr output by the decimator circuit 16 are supplied to the multiplexer 14. The multiplexer 14 multiplexes together (including time compressing) the luminance signal Y and the filtered and sub-sampled color difference signals Pb and Pr as described above to produce a MAC signal which is output on a line 26.

The encoder 10 as so far described is of known construction. The encoder 10 is distinguished from the known construction by the following features. The encoder 10 includes a marker detector 28 which is connected to monitor or examine the incoming signal for the presence of marker information indicative of whether the signal has previously been MAC encoded. More specifically, since in the present embodiment the marker information comprises (as explained in more detail below) a marker or flag which is contained in the luminance signal Y at a predetermined position in every frame, the marker detector is connected to monitor the luminance signal Y (though it could instead monitor one or more of the RGB signals input to the matrix circuit 12). If the marker detector 28 does not detect the marker or flag, it takes no action. The encoder 10 then operates in the same manner as the known encoder. However, if the marker detector 28 does detect the marker or flag, it is operative on the decimator circuit 16 to disable the operation of the filters 18 and 22, for example by causing the color difference signals Pb and Pr to bypass the filters, so as to inhibit the above-described vertical filtering of the color difference signals. Thus, in this event, whereas the color difference signals Pb and Pr are still vertically sub-sampled, they are not vertically filtered.

Figure 3:
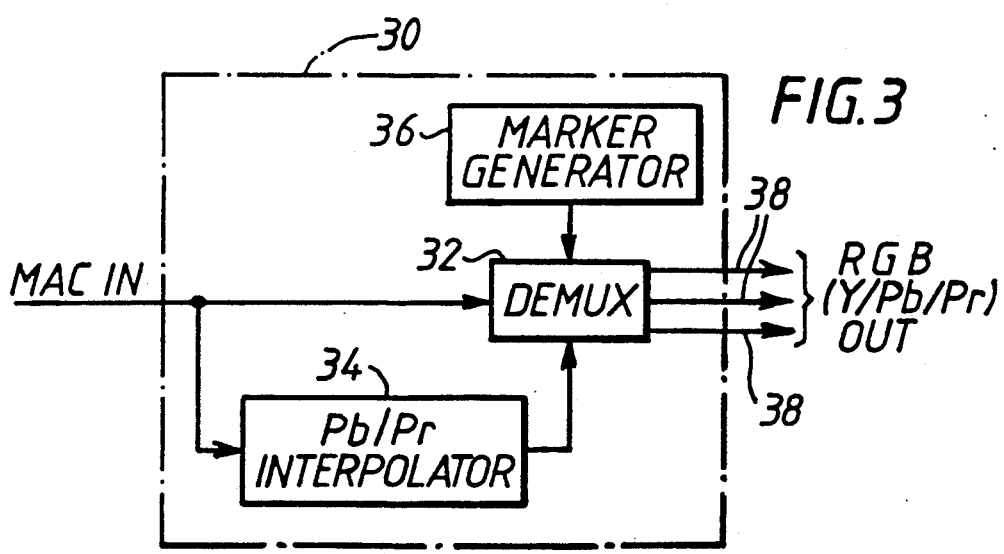
FIG. 3 is a schematic block diagram of a MAC decoder embodying the invention.

FIG. 3 shows a MAC decoder 30 embodying the invention for decoding a signal in MAC format. The MAC signal is applied to a demultiplexer (DEMUX) 32 and to a Pb/Pr interpolator 34. In the interpolator 34, the received color difference signals Pb and Pr are interpolated to estimate the color difference information that was discarded, prior to transmission, in the sub-sampling operation. The interpolator 34 comprises an interpolation filter that estimates, for each line, values for that one of the two color difference signals that was not transmitted for that line by taking averages between that one of the two color difference signals transmitted during other lines, for example the two lines immediately above and below it. The estimated values are passed to the demultiplexer 32, in which the transmitted luminance signal Y, the transmitted color difference signals Pb and Pr and the estimated color difference signals Pb and Pr are demultiplexed (which includes de-time compressing) or converted into a non-MAC format such as RGB or Y/Pb/Pr and output on lines 38.

The decoder 30 as so far described is of known construction. The decoder 30 is distinguished from the known construction by the following feature. The decoder 30 includes a marker generator 36 operative to generate marker information of the nature set forth in the above description of the encoder 10 shown in FIG. 2, and to cause the marker information to be contained in the non-MAC format signal output by the decoder 30. Therefore, should the output signal of the decoder 30 be input into an encoder like that of FIG. 1, either in real time or after recording, or even should a multiple generation copy of a recording of the signal be input into an encoder like that of FIG. 1, the marker information will indicate to the marker detector 28 of the encoder that the signal has previously been MAC encoded, and therefore that the color difference signals Pb and Pr thereof have been vertically filtered as described above, as a result of which the color difference signals will not be vertically filtered again.

In the decoder 30 as depicted schematically in FIG. 3, the marker generator 36 is shown as being connected to the demultiplexer 32 so as to insert the marker information during the course of demultiplexing. It should be appreciated, however, that the marker information can be inserted anywhere, provided that it appears in the non-MAC format signal output by the decoder 30. For instance, the marker information could be inserted into the MAC signal before the signal reaches the demultiplexer 32, for example by connecting the marker generator 36 to or in the line directing the MAC signal to the demultiplexer, or it could be inserted into the non-MAC signal output by the demultiplexer, for example by connecting the marker generator to or in one or more of the lines 38 (for example, if the marker information is to be contained in the luminance information, to or in the Y line only in the case of a Y/Pb/Pr output and to or in all three lines in the case of an RGB output).

The marker information caused to be contained in the non-MAC format signal by the marker generator 36 of the decoder 30 and recognised by the marker detector 28 of the encoder 10 can in principle be of any recognisable form and can be contained anywhere in the non-MAC format signal. It can, for example, as suggested above in the description of the encoder 10 of FIG. 2, be contained in luminance information of the signal, in which event it preferably is contained in a vertical blanking interval so as not to interfere with the picture. For example, in the case of a 625 line system as used, for instance, in the UK, the marker information can be contained in line 21, where space not needed for other purposes is currently available. Advantageously, the marker information is such as to be visible if the vertical blanking interval is viewed, for instance by way of a monitor which can be switched into an underscanned mode (in which the vertical blanking interval is displayed above the picture). According to a particularly preferred embodiment, the marker information is in the form of a simple peak white bar or level present for two microseconds after the start of a line (preferably, as mentioned above, line 21 in the case of a 625 line system) in every vertical blanking interval. The marker information is then not only visible, but can easily be identified whether the signal is in either analog or digital form, for instance by causing the marker detector 28 to look at the luminance level of the appropriate line at a timing of one microsecond after active line start (that is, at the centre of the nominal position of the white bar) and to decide that the marker information is present if, at that time, the amplitude of the luminance signal Y is greater than 0.61 V (if in analog form) or greater than an equivalent digital level (if in digital form). Also, the marker information is then readily capable of being recorded on a VTR.

The present invention is applicable to any of the different versions of the MAC system, for example ordinary definition MAC, widescreen MAC, high definition MAC, B-MAC, C-MAC, D-MAC, D2-MAC and so on. The invention should also be applicable to any future type of MAC system or to any derivation of the MAC system characterized in that the chrominance information is divided into plural signals which are sent on a line sequential basis in such a manner that each line of the same number in successive frames carries the same such signal, and in that the plural signals are vertically filtered and vertically sub-sampled in the encoding process.

Although illustrative embodiments of the invention have been described in detail herein with reference to the accompanying drawing, it is to be understood that the invention is not limited to those precise embodiments, and that various changes and modifications can be effected therein by one skilled in the art without departing from the scope and spirit of the invention as defined by the appended claims.

I claim:

1. A MAC signal encoder for encoding a video signal into MAC format, said video signal including a luminance signal and color difference signals and having a marker signal indicating previous MAC encoding of the information therein selectively associated therewith, said encoder comprising:

vertical filter means for vertically filtering said color difference signals so as to limit their spectra to a band below a predetermined vertical frequency;

vertical sub-sampling means for vertically sub-sampling the color difference signals filtered by said vertical filter means to produce vertically sub-sampled color difference signals, said vertical sub-sampling means being operative to sub-sample said color difference signals at a predetermined sub-sampling rate such that the Nyquist frequency of said vertically sub-sampled color difference signals is substantially the same as said predetermined vertical frequency;

multiplexer means for multiplexing the vertically sub-sampled color difference signals with said luminance signal to produce a signal in MAC format; and detector means responsive to said marker signal for selectively inhibiting the operation of said vertical filter means to prevent vertical filtering of said color difference signals thereby.

2. An encoder according to claim 1, wherein said detector means is responsive to said marker signal contained in the luminance signal.

3. An encoder according to claim 2, wherein said detector means is responsive to said marker signal contained in a vertical blanking interval of said luminance signal.

4. An encoder according to claim 3, wherein said detector means is responsive to said marker signal contained in the twenty-first line of a 625 line video signal.

5. An encoder according to claim 3, wherein said detector means is responsive to said marker signal provided as a peak white level of said luminance signal at a predetermined timing after the start of a line of said vertical blanking interval.

6. A method of encoding a video signal into MAC format, said video signal including a luminance signal and color difference signals and having a marker signal indicating previous MAC encoding of the information therein selectively associated therewith, said method comprising:

examining said video signal to determine whether it contains said marker signal indicating that the video signal has previously been MAC encoded;

in the event that said video signal does not contain said marker signal, vertically filtering said color difference signals so as to limit their spectra to a band below a predetermined vertical frequency, while inhibiting the preformance of said vertical filtering step in the event said video signal contains said marker signal;

vertically sub-sampling the color difference signals to produce vertically sub-sampled color difference signals at a predetermined sub-sampling rate such that the Nyquist frequency of said vertically sub-sampled color difference signals is substantially the same as said predetermined vertical frequency; and multiplexing the sub-sampled color difference signals with said luminance signal to produce a signal in MAC format.

7. A method according to claim 6, wherein said examining step comprises determining whether said video signal contains said marker signal in said luminance signal.

8. A method according to claim 7, wherein said examining step comprises determining whether said luminance signal contains said marker signal in a vertical blanking interval thereof.

9. A method according to claim 8, wherein said examining step comprises examining the twenty-first line of a 625 line video signal to determine whether said marker signal is present therein.

10. A method according to claim 8, wherein said examining step comprises determining whether said luminance signal includes said marker signal in the form of a peak white level at a predetermined timing after the start of a line of said vertical blanking interval.

11. A MAC signal decoder for decoding a video signal which is in MAC format containing vertically sub-sampled color difference signals into a video signal in non-MAC format, said decoder comprising:

interpolating means for interpolating between said vertically sub-sampled color difference signals to produce estimated color difference signals;

demultiplexer means for demultiplexing said video signal in MAC format and said estimated color difference signals to thereby produce a video signal in non-MAC format; and marker means for generating a marker signal indicating that the video signal in non-MAC format has previously been MAC encoded, and for including said marker signal in said video signal in non-MAC format.

12. A decoder according to claim 11, wherein said demultiplexer means is operative to produce said video signal in non-MAC format including luminance information, and said marker means is operative to cause said marker signal to be contained in the luminance information of said video signal in non-MAC format.

13. A decoder according to claim 12, wherein said marker means is operative to cause said marker signal to be contained in a vertical blanking interval of said video signal in non-MAC format.

14. A decoder according to claim 13, wherein said demultiplexer means is operative to produce a 625 line video signal in non-MAC format, and wherein said marker means is operative to cause said marker signal to be included in line 21 of said 625 line video signal in non-MAC format.

15. A decoder according to claim 13, wherein said marker means is operative to include said marker signal in said vertical blanking interval in a form such that said marker signal will be visible if said vertical blanking interval is displayed.

16. A decoder according to claim 15, wherein said marker means is operative to include said marker signal in said video signal in non-MAC format in the form of a peak white level present during a predetermined interval of a line of said vertical blanking interval.

17. A method of decoding a video signal which is in MAC format containing vertically sub-sampled color difference signals into a video signal in non-MAC format, said method comprising:

interpolating between the vertically sub-sampled color difference signals to produce estimated color difference signals;

demultiplexing the video signal in MAC format and said estimated color difference signals to produce a video signal in non-MAC format; and generating a marker signal indicating that the video signal in non-MAC format has previously been MAC encoded, and including said marker signal in said video signal in non-MAC format.

18. A method according to claim 17, wherein the step of including said marker signal in said video signal in non-MAC format comprises including said marker signal in luminance information thereof.

19. A method according to claim 18, wherein the step of including said marker signal in said video signal in non-MAC format comprises including said marker signal in a vertical blanking interval thereof.

20. A method according to claim 19, wherein said step of producing a video signal in non-MAC format comprises producing a 625 line video signal, and said step of including a marker signal in said video signal in non-MAC format comprises including said marker signal in line 21 of said 625 line video signal in non-MAC format.

21. A method according to claim 19, wherein the step of including said marker signal in said video signal in non-MAC format comprises including a marker signal which will be visible if said vertical blanking interval is displayed.

22. A method according to claim 21, wherein the step of including said marker signal in said video signal in non-MAC format comprises including said marker signal in the form of a peak white level present during a predetermined interval of a line of said vertical blanking interval.

23. Apparatus for recording a video signal in MAC format, comprising:

an input terminal for receiving a video signal including a luminance signal and color difference signals and having a marker signal indicating previous MAC encoding of the information therein selectively associated therewith;

vertical filter means for vertically filtering said color difference signals so as to limit their spectra to a band below a predetermined vertical frequency;

vertical sub-sampling means for vertically sub-sampling the color difference signals filtered by said vertical filter means to produce vertically sub-sampled color difference signals, said vertical sub-sampling means being operative to sub-sample said color difference signals at a predetermined sub-sampling rate such that the Nyquist frequency of said vertically sub-sampled color difference signals is substantially the same as said predetermined vertical frequency;

multiplexer means for multiplexing the vertically sub-sampled color difference signals with the luminance signal to produce a video signal in MAC format;

detector means responsive to said marker signal for selectively inhibiting the operation of said vertical filter means to prevent vertical filtering of said color difference signals thereby; and means for recording said video signal in MAC format on a record medium.

24. The apparatus of claim 23, further comprising:

means for reproducing a video signal in MAC format from said record medium to produce a reproduced video signal including vertically sub-sampled color difference signals;

interpolating means for interpolating between the vertically sub-sampled color difference signals in said reproduced video signal to produce estimated color difference signals;

demultiplexer means for demultiplexing said reproduced video signal and said estimated color difference signals to thereby produce a reproduced video signal in non-MAC format; and marker means for generating a marker signal indicating that the information in said reproduced video signal in non-MAC format had previously been MAC encoded, and for including said marker signal in said reproduced video signal.

25. Apparatus for reproducing a video signal in MAC format including vertically sub-sampled color difference signals and recorded on a record medium, and for converting the reproduced video signal in MAC format to a video signal in non-MAC format including a marker signal indicating that the information therein had previously been MAC encoded, comprising:

means for reproducing said video signal in MAC format from said record medium to provide a reproduced video signal;

interpolating means for interpolating between the vertically sub-sampled color-difference signals in said reproduced video signal to produce estimated color difference signals;

demultiplexer means for demultiplexing said reproduced video signal and said estimated color difference signals to thereby produce said reproduced video signal in non-MAC format; and marker means for generating said marker signal indicating that the information in said reproduced video signal in non-MAC format had previously been MAC encoded, and for including said marker signal in said reproduced video signal in-MAC format.

* * * * *